INVENTOR
J. J. GILBERT
BY W. F. Dawson
ATTORNEY

Sept. 12, 1950             J. J. GILBERT            2,522,362
CABLE TESTING METHOD BY TRANSMITTING PULSES OF
DIFFERENT RATES OF PROPAGATION
Filed Dec. 10, 1948                                3 Sheets-Sheet 3
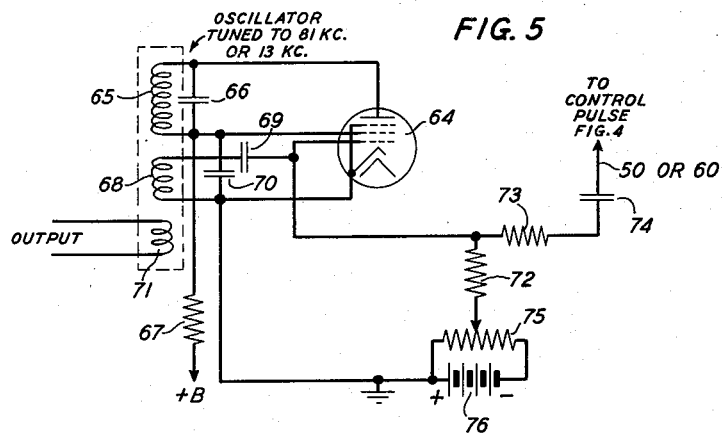
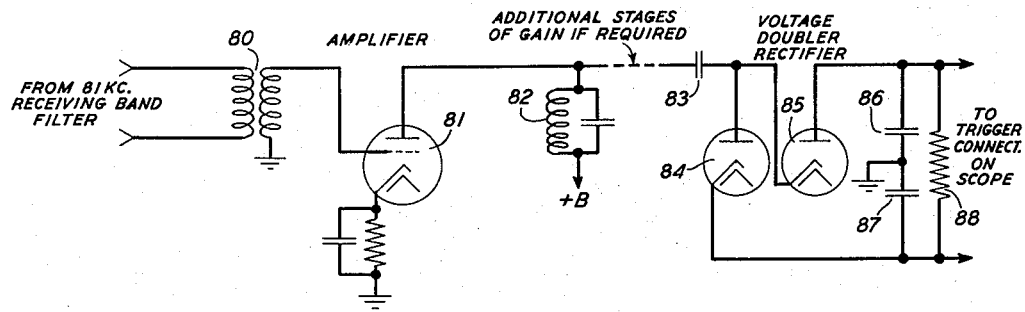
INVENTOR
J. J. GILBERT
BY
W. Dawson
ATTORNEY Patented Sept. 12, 1950

2,522,362

UNITED STATES PATENT OFFICE 2,522,362

CABLE TESTING METHOD BY TRANSMITTING PULSES OF DIFFERENT RATES OF PROPAGATION

John J. Gilbert, Douglaston, N. Y., assignor to Bell Telephone Laboratories, Incorporated, New York, N. Y., a corporation of New York Application December 10, 1948, Serial No. 64,653

6 Claims. (Cl. 179—175.31)

This invention relates to a method and means for testing long, inaccessible electrical cables, and particularly to a method and means for testing long, submarine cables used for the transmission of intelligence by telephony or telegraphy.

The object of the invention is a method and means for indicating, at an accessible point in the cable, the presence of transmission irregularities in an inaccessible length of the cable.

A feature of the invention is a method and means for testing an electrical cable by supplying to the cable a short pulse of electomagnetic waves having one velocity of transmission and, after a predetermined time interval, supplying to the cable a second short pulse of electromagnetic waves having a higher velocity of transmission, so that the second pulse will overtake and pass the first pulse, causing the two pulses to overlap within a determinable portion of the cable, and measuring the products of the intermodulation of the waves.

Another feature of the invention is means for repeatedly supplying to the cable successive pulses of electromagnetic waves having different velocities of transmission, and varying the time intervals between the supply of the successive pulses.

In recent years, the use of long cables for the transmission of intelligence, such as telephone and telegraph cables, has been rapidly increasing; and, this use has aroused considerable interest in the problem of using cables of this general character laid through tellitory, such as through the ocean or other large body of water, in which the cable is not easily accessible. Due to the transmission losses in such cables, the transmitted waves must be amplified at rather short intervals, thus necessitating the use of submerged repeaters spaced some thirty to fifty miles apart along the cable. These repeaters may be encased within an enlargement of the cable sheath; and, with skillful design and good materials, the average useful life of the repeaters is satisfactory, though it is reasonable to expect that an occasional repeater will have a useful life less than the average. Thus, it is important to be able to test the electrical condition of the individual repeaters from some accessible spot, such as the cable terminals. By such tests the gradual deterioration in the repeaters may be measured at frequent intervals, and arrangements made to repair a faulty repeater in a season of the year when weather conditions are favorable, materially reducing the cost of the necessary cable ship operations.

The cable and associated equipment are constructed to produce a transmission characteristic as nearly linear as practicable; and the gradual deterioration of a repeater, or other item of the equipment, produces an irregularity, or non-linearity, in the transmission characteristic. When two electromagnetic waves of different frequencies are supplied to a cable system having a linear transmission characteristic, these waves will be transmitted without interaction; but, if some part of the cable system has a non-linear transmission characteristic, the two waves will interact to produce intermodulation products, which have the properties of electromagnetic waves having frequencies related to the frequencies of the original waves.

It has been found that the time of propagation of a sinusoidal current over a long cable depends upon the frequency of the current; the higher frequency currents being propagated at somewhat faster speeds than the lower frequency currents. If a short train of waves of the lower frequency is supplied to the cable, then, after a short time interval, another train of waves of the higher frequency is supplied to the cable, due to the difference in the velocities of propagation, the train of waves of the higher frequency will overtake the other train, the two trains of waves will overlap in some portion of the cable, the train of waves of the higher frequency eventually passing the other train of waves and reaching the end of the cable before the other train of waves. If, in the portion of the cable in which the two trains of waves overlap, there is some element, such as a defective repeater, having a non-linear transmission characteristic, this element will cause the two waves to intermodulate and to produce intermoduation products, having frequencies differing from the frequency of either of the trains of waves. These intermodulation products will be propagated to the end of the cable, where these products may be detected to give an indication that the portion of the cable has a non-linear characteristic.

By starting with a small time interval, and repeatedly supplying trains of waves separated by gradually increasing intervals of time, the successive pairs of trains of waves may be caused to overlap in successive portions of the cable, until the whole length of the cable has been tested.

The invention will be easily understood from the following detailed description, read in connection with the drawings in which:

Figs. 4, 5, 6 are respectively a timing circuit, oscillator circuit, and control circuit forming parts of the system shown in Fig. 3.

Figure 1:
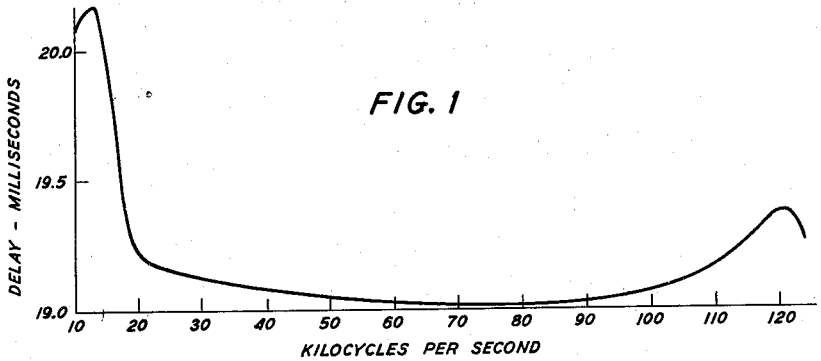
Fig. 1 is a graph of the completed delay in a typical cable system.

Fig. 1 is a graph of the computed delay, or time taken to propagate electrical waves of different frequencies through a cable of about 2000 nautical miles in length, which might be used for the transmission of telephone and telegraph messages under the Atlantic Ocean. The useful band of frequencies used in the operation of this cable would extend from say 20 kilocycles per second to say 110 kilocycles per second, and in this region the delay is slightly more than 19 milliseconds, the lowest value being in the vicinity of 80 kilocycles per second. The delay for a wave having a frequency of about 12 kilocycles per second is more than 20 milliseconds. The velocity of propagation of a wave of about 80 kilocycles per second is some 105,000 nautical miles per second, and the velocity of propagation of a wave of 12 kilocycles per second is some 100,000 nautical miles per second, but, due to the phase shifts in the filters used in the system, the delay time for a wave of 12 kilocycles per second is increased.

The cable system may be of the type shown in United States Patent 2,009,438, July 30, 1935, H. W. Dudley, in which the frequency of one of the oscillators is adjusted to 12 kilocycles per second; and the other oscillators are adjusted to produce channels spaced 4 kilocycles per second apart, from 20 kilocycles per second to 108 kilocycles per second.

Figure 2:
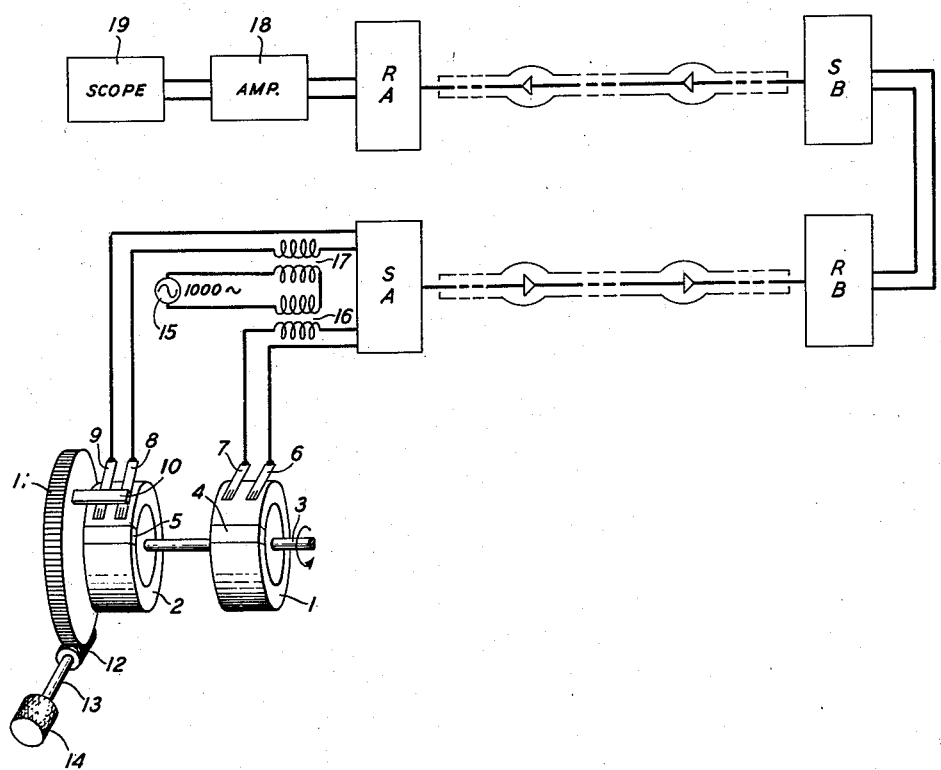
Fig. 2 is a simple cable system embodying the invention.

In Fig. 2, the commutators 1, 2, are secured to shaft 3 and rotated at a fairly high speed by some suitable motor means (not shown). The surfaces of the commutators 1, 2, are formed of non-conducting material, except for the narrow conducting segments 4, 5. The brushes 6, 7, are insulatingly mounted upon some suitable support (not shown) and bear on the surface of commutator 1. The brushes 8, 9, bear on the surface of commutator 2 and are supported by an insulator 10 affixed to a gear 11 rotatably mounted on shaft 3. A worm 12, engaging the gear 11, is mounted on a shaft 13, journalled in some suitable support (not shown) and may be rotated by the knurled knob 14. By rotating the knob 14 the brushes 8, 9, will be traversed around the circumference of the commutator 2.

A local oscillator 15, having a frequency of say 1 kilocycle per second, is connected in serial relationship with the primary windings of two transformers 16, 17. The secondary winding of transformer 16, and the brushes 6, 7, are connected to the input circuit of the 12 kilocycles per second channel, so that, when the brushes 6, 7, make contact with the segment 4, a train of waves having a frequency of 13 kilocycles per second will be supplied to the cable. Similarly, the secondary winding of transformer 17, and the brushes 8, 9, are connected to the input circuit of the 80 kilocycles per second channel, so that, when the brushes 8, 9, make contact with the segment 5, a train of waves having a frequency of 81 kilocycles per second will be supplied to the cable.

The trains of waves are transmitted through the sending apparatus SA, of station A, to the cable and through the cable to the receiving apparatus RB, of station B, where the products of intermodulation may be measured; or, as shown, the receiving apparatus RB may be connected to the sending apparatus SB, of another cable at station B, thence through this cable to the receiving apparatus RA, at station A, where, after suitable amplification, as in amplifier 18, the received waves may be registered on some suitable device, such as the cathode ray oscilloscope 19.

For any given speed of rotation of the shaft 3, the lengths of the trains of waves supplied to the cable will be determined by the widths of the segments 4, 5; and the time interval between the supply of the two trains of waves to the cable will be determined by the displacement, around the periphery of commutator 2, of the brushes 8, 9, relative to the brushes 6, 7.

Preferably, the segments 4, 5, are sufficiently wide that one or two complete cycles, at least of each wave are supplied to the cable. These segments should not be too wide, as then the section of cable in which overlapping occurs will be undesirably long. It can be shown that the length of cable S, in which overlap of the two trains occurs, is given by $$S = S_2 + \frac{V_2}{V_2 - V_1}(S_1 + S_2) \qquad (1)$$

where $S_2$ and $V_2$ are respectively the length in nautical miles and the velocity of propagation of the faster train; $S_1$ and $V_1$ are the corresponding quantities for the slower train. Assume the velocity of propagation, $V_1$, of the 13 kilocycles per second wave is 100,000 nautical miles per second, and the velocity of propagation, $V_2$, of the 81 kilocycles per second wave is 105,000 nautical miles per second, then $$\frac{V_2}{V_2 - V_1} = 21$$

As the wavelength of a single cycle of the 13 kilocycles per second wave is $100/13$ nautical miles and the wavelength of a single cycle of the 81 kilocycles per second wave is $105/81$ nautical miles, the minimum overlap will be $$S = \frac{105}{81} + 21\left(\frac{100}{13} + \frac{105}{81}\right) = 190 \text{ nautical miles}$$

In order to have the leading ends of the two wave trains meet at a distance X nautical miles from the sending end, the slower train must be started at a time $t$ in advance of the start of the faster train, where $$t = X\left(1 - \frac{1}{1.05}\right)10^{-5} = 5 \times 10^{-7} \, X \text{ seconds}$$

For repeaters spaced at intervals of 40 nautical miles along a 2000 nautical mile cable $t$ will vary from 20 microseconds to 1 millisecond. Preferably, the time interval between the first two trains of waves is 20 microseconds, and this interval is increased by 20 microseconds for each successive pair of trains of waves so that the condition of each repeater may be determined.

Figure 3:
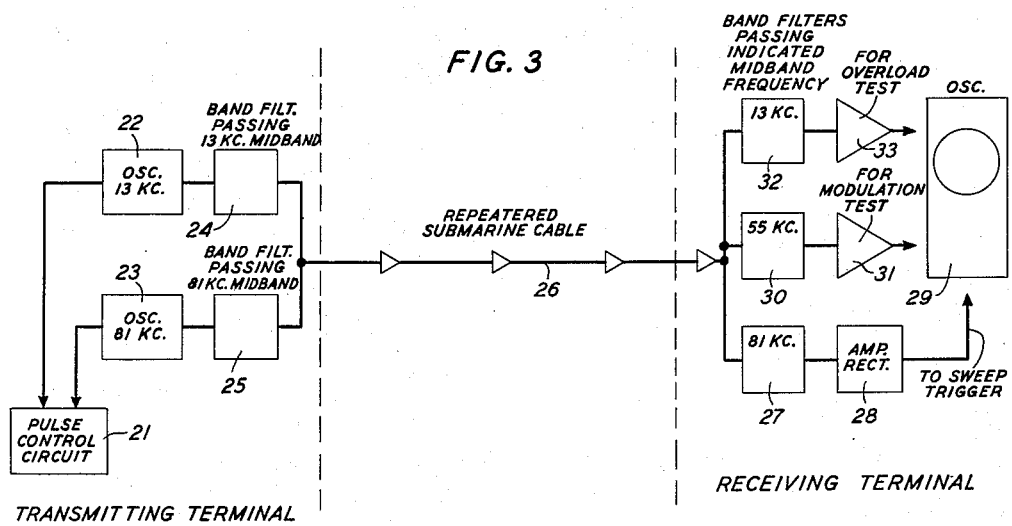
Fig. 3 is a more elaborate cable system embodying the invention.

An alternative arrangement employing electronic timing circuits is shown in block form in Fig. 3. At the transmitting terminal, a pulse control circuit 21, of the type shown in Fig. 4, alternately pulses two oscillators 22, 23, of the type shown in Fig. 5, to respectively generate trains of waves having frequencies of 13 kilocycles per second, and 81 kilocycles per second. Since the velocity of propagation of the 13 kilocycles per second wave is less than the velocity of propagation of the other wave, the 13 kilocycles per second oscillator is pulsed first, then, after an adjustable delay, the 81 kilocycles per second oscillator is pulsed. The trains of waves pass through the filters 24, 25, and are transmitted over the repeatered cable 26. The time interval, or delay, between the two trains of waves is adjusted to cause the two trains of waves to overlap in the section of cable containing the repeaters to be tested. If the repeaters in this section of cable are defective, and produce modulation products of substantial amplitude, these products will be propagated, along with the original trains of waves, to the receiving terminal.

The 81 kilocycle per second train of waves will be propagated with the largest velocity, and will reach the receiving terminal before the other trains of waves. At the receiving terminal, the 81 kilocycles per second wave is selected by the band-pass filter 27, amplified and rectified by the amplifier-rectifier 28, which may be of the type shown in Fig. 6, and supplied to the cathode ray oscilloscope 29, to trigger, or start, the horizontal sweep of the cathode ray. The cathode ray oscilloscope 29 may, of course, be replaced by any other suitable indicating or recording instrument, and the voltage from the rectifier 28 used to initiate the production of one parameter of the record.

Among the products of intermodulation is the difference frequency $f_2 - 2f_1$, in the present case $81 - 26 = 55$ kilocycles per second, which may conveniently be used to indicate the occurrence of intermodulation. The 55 kilocycles per second wave is selected by the band-pass filter 30, amplified, if necessary, in the amplifier 31, and supplied to the vertical plates of the oscilloscope 29. The presence of this component in the received wave will be indicated by a deflection of the cathode ray.

It is well known that certain types of amplifiers, such as reverse feedback amplifiers, overload quite abruptly, and this phenomenon may be used to indicate when one of the repeaters has deteriorated in this respect, even if the deterioration does not result in the production of intermodulation products. For this purpose, the amplitude of one of the trains of waves is adjusted so that the repeaters in the cable will be substantially fully loaded by the two trains of waves, and the amplitudes of this train of waves may be observed on the oscilloscope, so that a sudden change in amplitude will indicate that a repeater in the section of cable under test has overloaded.

The 13 kilocycles per second wave thus may be selected by the filter 32, amplified, if desired, by amplifier 33 and supplied to the vertical plates of the oscilloscope 29, in place of the output from amplifier 31.

Figure 4:
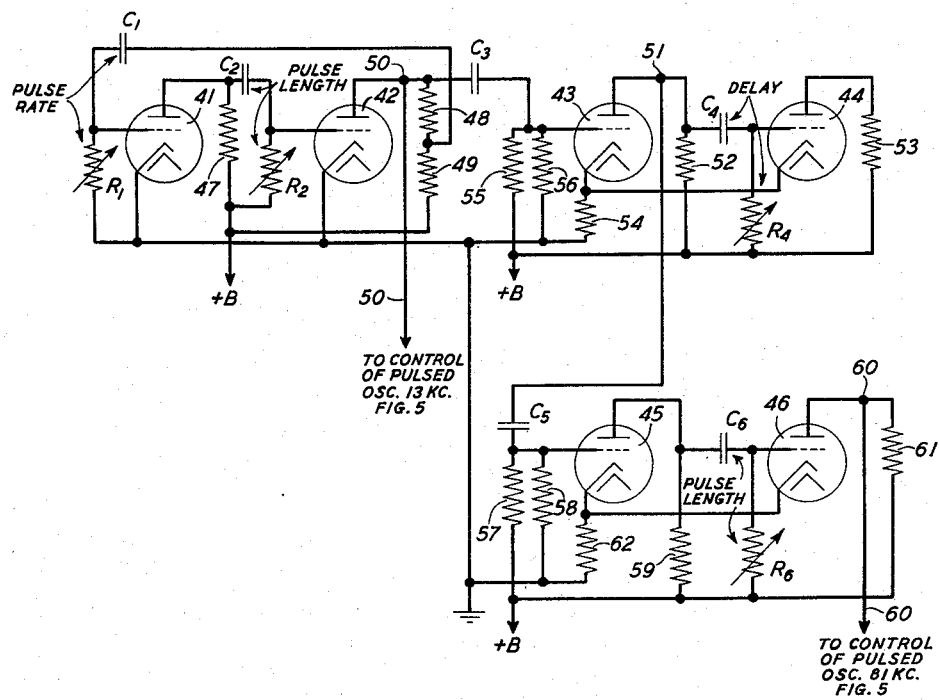

In Fig. 4, the anode of vacuum tube 41 is connected through resistor 47 to the grounded anode supply (not shown) and through capacitor $C_2$ to the control grid of vacuum tube 42. The control grid of vacuum tube 42 is connected through adjustable resistor $R_2$ to the anode supply, or, if preferred, to ground. The anode of vacuum tube 42 is connected through resistors 48, 49, in serial relationship, to the anode supply, and through capacitor $C_1$ to the control grid of vacuum tube 41. The control grid of vacuum tube 41 is connected through resistor $R_1$ to the grounded cathodes of vacuum tubes 41, 42. The heaters of vacuum tubes 41, 42, are energized from the usual supply (not shown).

Starting with the anode current of vacuum tube 41 cut off, and anode current flowing in vacuum tube 42, the anode of vacuum tube 41 will have a high positive potential, while the anode of vacuum tube 42, and the junction of resistors 48, 49, will be at a low potential.

A small current will flow through $R_2$ to the control grid of vacuum tube 42 so that this grid will have a small positive potential maintaining its anode current flowing. A necessary condition to the cutting off of anode current in tube 41 is that the control grid of tube 41 be at a negative potential with respect to its cathode. This negative potential diminishes as the charge on $C_1$ leaks away to a lower value through $R_1$, the anode-cathode path in tube 42 and the resistor 48. It is obvious that when the discharging current in this circuit through $R_1$ approaches zero the potential of the control grid of tube 41 approaches zero causing anode current to flow in this tube. Capacitor $C_2$ had been charged through the grid-cathode path of vacuum tube 42 in parallel with $R_2$, the anode supply, and resistor 47. Since the effective resistance of the grid-cathode path of tube 42 is low to the positive voltage supplied through $R_2$ and the drop through resistor 47 is negligible, $C_2$ is charged to a potential difference approaching that of the anode supply. The sudden flow of anode current in tube 41 causes a large drop in resistor 47; this drop carries the control grid of tube 42 to a large negative potential because $C_2$ offers low impedance to such abrupt change. Since the control grid of tube 42 is negative its grid-cathode impedance becomes very high and $C_2$ discharges slowly through $R_2$ and resistor 47. The large negative potential on the control grid of vacuum tube 42 cuts off the flow of anode current in vacuum tube 42. When the anode current of vacuum tube 42 is cut off, the potential of the anode of this tube, and the point 50, will rise to the potential of the anode supply, impressing a positive potential on the connection to the point 50. As the capacitor $C_2$ continues to discharge, the discharge current diminishes, reducing the potential drop in resistor $R_2$, and the negative potential on the signal grid of vacuum tube 42, until, eventually, the negative potential is small enough that the anode current can again flow in vacuum tube 42, reducing the potential of the anode, and the connection to point 50, to a small value. The duration of the positive potential on the connection to point 50, which determines the length of the train of waves of 13 kilocycles per second supplied to the cable, is determined by the time required to discharge capacitor $C_2$, and this time is controlled mainly by the value of the high resistance of resistor $R_2$. The resistor $R_2$ may be of the order of 1 megohm, and the capacitor $C_2$ of the order of 1 or 200 micromicrofarads.

While tube 41 is conducting, and tube 42 is cut off, the junction of resistors 48, 49 will have a potential a little less than that of the anode supply, and capacitor $C_1$ will charge up to this higher potential. As the grid-cathode resistance of tube 41 may be fairly low when the grid is driven positive through $C_1$ and the resistance of resistor 49 fairly low, capacitor $C_1$ may be fully charged before capacitor $C_2$ has completed its discharge.

When tube 42 commences to conduct the potential of the junction point of 48, 49 falls to a low value, capacitor $C_1$ passes this sudden drop to the control grid of tube 41 driving it negative, cutting off the anode current. $C_1$ also commences to discharge through resistor 48, the anode-cathode path of tube 42, and resistor $R_1$. The decaying voltage drop in resistor $R_1$ impresses a decaying negative potential on the signal grid of tube 41 until the voltage drop across resistor R₁ has fallen to a small value. As the resistance of resistor R₁ and the capacitance of capacitor C₁ may both be fairly large, the anode current of tube 41 may be cut off for a number of seconds, or even minutes. As each cycle of operation of this circuit initiates a test of the cable, the operating time of the circuit is the time interval between successive tests.

The anode of vacuum tube 42 is coupled through capacitor C₃ to the control grid of vacuum tube 43. The anode of vacuum tube 43 is connected through resistor 52 to the anode supply (not shown), and through capacitor C₄ to the control grid of vacuum tube 44. The anode of vacuum tube 44 is connected through resistor 53 to the anode supply. The cathodes of vacuum tubes 43, 44, are connected together, and through resistor 54 to ground. The anode currents in resistor 54 produce a fairly large positive voltage on the cathodes of vacuum tubes 43, 44. The potential divider, formed of resistors 55, 56, connected from the anode supply to ground, partially counteracts the bias due to resistor 54, to make the control grid of vacuum tube 43 normally negative with respect to the cathode so as to cut off, or reduce to a small value, the anode current of tube 43. Resistor R₄, connected from the control grid of tube 44 to the anode supply, impresses a fairly large positive potential on the control grid of tube 44 which counteracts the bias due to resistor 54, so that the anode current of tube 44 normally is large.

With the anode current of tube 43 cut off, the point 51 has substantially the potential of the anode supply, thus capacitor C₅ is positively charged. When the point 50 is driven positive, sending a pulse to control the 13 kilocycles per second oscillator, this positive potential pulse also passes readily through capacitor C₃ and charges capacitor C₃ through the grid-cathode impedance of tube 43 in parallel with resistor 56, the anode supply and resistors 48, 49.

Since this positive pulse impresses a positive voltage on the control grid of tube 43, the anode then conducts, lowering the potential of point 51. When the potential of point 51 is lowered, capacitor C₅ will pass this potential drop on to the control grid of tube 45; and capacitor C₄ will pass this potential drop on to the control grid of tube 44, cutting off the anode current in this tube. The anode current of tube 44 is larger than the anode current of tube 43, thus, when the anode current of tube 44 is cut off, the resultant current in resistor 54 is reduced, reducing the voltage on the cathodes of tubes 43, 44, so that tube 43 continues to conduct anode current. The anode current of tube 44 will be cut off until the negative voltage, due to the discharge of capacitor C₄ through resistor R₄, decreases to a value which is counteracted by the positive potential from the anode supply. This time interval is largely determined by the time constant C₄R₄, and may be changed by adjusting R₄.

When anode current again flows in tube 44, this current flowing in resistor 54 restores the negative bias on the control grid of tube 43. When tube 42 also conducts and capacitor C₃ discharges through the anode-cathode path of tube 42 and resistor 56 impressing an additional negative potential on the control grid of tube 43 this has no effect. Tube 43 is thus cut off, and the potential of point 51 rises to substantially the potential of the anode supply, causing capacitor C₄ to charge quickly through grid-cathode impedance in parallel with resistor R₄; resistor 52, C₄ readily passing the positive potential pulse on to the signal grid of tube 44, maintaining the flow of anode current in this tube, and also pass through capacitor C₅ a positive potential on to the signal grid of tube 45.

The anode of tube 45 is connected through resistor 59 to the anode supply (not shown) and through capacitor C₆ to the control grid of tube 46. The anode of tube 46 is connected through resistor 61 to the anode supply; and the cathodes of tubes 45, 46 are connected together, and through resistor 62, to ground. The current flowing in resistor 62 impresses a fairly large positive voltage in the cathodes of tubes 45, 46. The control grid of tube 46 is connected through resistor R₆ to the anode supply, and this positive potential counteracts the bias due to resistor 62, so that the anode current of tube 46 is normally quite large. The potential divider formed of resistors 57, 58, connected across the anode supply and to the control grid of tube 45 supplies a potential which partially counteracts the bias from resistor 62, but not completely, so that the anode current of tube 45 is normally cut off. The heaters of tubes 45, 46, are energized from the usual supply (not shown).

When capacitor C₅ passes a negative pulse from point 51 on to the grid of tube 45 because tube 43 starts to conduct, as tube 45 is normally biased beyond cut off, this voltage will have no effect. However, when the discharge cycle of capacitor C₄ is completed, and point 51 suddenly rises to a high positive potential, capacitor C₅ passes a positive voltage on to the grid of tube 45, causing tube 45 to conduct, thus lowering the potential of the anode of tube 45. Capacitor C₆ is connected, through resistors 59, R₆, to the anode supply, and is normally charged; but, when the anode potential of tube 45 suddenly falls, capacitor C₆ passes this negative pulse on to the grid of tube 46, cutting off the flow of anode current in tube 46. Also capacitor C₆ will discharge through the resistor 59 and resistor R₆. As the anode current of tube 46 is larger than the anode current of tube 45, the cessation of the anode current from tube 46 reduces the bias impressed on the grid of tube 45 by the voltage drop in resistor 62, so that the anode current continues to flow in tube 45 after the charging cycle of capacitor C₅ has been completed. The cessation of anode current causes the potential of the anode of tube 46, and of point 60, to rise suddenly, impressing a positive potential on the connection to point 60.

After a time interval determined largely by the time constant C₆R₆, the discharging current of capacitor C₆ will decrease until the negative potential impressed upon the grid of tube 46, by the voltage drop in resistor R₆, is less than the positive potential from the anode supply, and tube 46 again conducts anode current, lowering the anode voltage and the potential applied to the connection 60. This heavy anode current, flowing in resistor 62, produces a large bias on the grid of tube 45, cutting off the anode current of tube 45, and causing the anode of tube 45 to rise to substantially the potential of the anode supply. Capacitor C₆ charges quickly through the grid-cathode impedance and R₆ in parallel, resistor 62, the anode supply and resistor 59 and also passes on a positive potential to the signal grid of tube 46. The flow of anode current in tube 46 is maintained by the large positive grid bias through R₆.

The time constant $C_2R_2$ controls the length of the train of waves of 13 kilocycles per second; the time constant $C_4R_4$ controls the time interval between the trains of waves; the time constant $C_6R_6$ controls the length of the train of waves of 81 kilocycles per second; and the time constant $C_1R_1$ controls the time interval between successive complete testing cycles. The time interval between the trains of waves may be changed by adjusting $R_4$. In a complete series of tests, this time interval may initially be quite small, and may be increased for each repetition of the test cycle, so that the successive overlaps of the trains of waves will occur in successive sections of cable until the whole cable has been tested.

Fig. 5 shows a controlled oscillator, suitable for the generation of a train of waves having a frequency of 13 or 81 kilocycles per second. The anode of the pentode vacuum tube 64 is connected through the winding 65, and resistor 67, to the anode supply (not shown). The capacitor 66 is connected across the winding 65 to form a tank circuit tuned to 13, or 81, kilocycles per second. The suppressor grid is connected to the cathode. The screen grid is connected through resistor 67 to the anode supply, and is by-passed by capacitor 70 connected to the grounded cathode. The signal grid is connected to the cathode through capacitor 69, and feedback winding 68, inductively coupled to winding 65; and through the grid leak resistor 72 to the brush of potentiometer 75 connected across the grounded battery 76. The output winding 71 is inductively coupled to the winding 65 and is connected through the appropriate filter to the cable. The brush of potentiometer 75 is adjusted to bias the grid so that the circuit is normally in a non-oscillating condition.

The capacitor 74 is connected through resistor 73 to the signal grid of tube 64 and to connection 50, or connection 60, Fig. 4.

When a positive potential is applied by connection 50, or connection 60, to capacitor 74, Fig. 5, capacitor 74 will pass the positive pulse to the control grid of tube 64 and this positive pulse counteracting the negative bias applied to the signal grid of tube 64 will cause the circuit to oscillate. When the positive potential is cut off by a negative pulse from point 50 or 60 the negative bias is restored to the signal grid of tube 64 and stops the oscillations. The time constant of the resistors 73 and 72 and capacitor 74 and other minor elements must be sufficiently long to maintain the full time of the positive pulse on the control grid of tube 64.

In Fig. 6, the 81 kilocycles per second receiving band filter is connected through transformer 80 to a suitable amplifier, symbolically represented by the amplifier tube 81, and tuned interstage network 82. The amplifier is coupled by capacitor 83 to the conventional voltage doubling rectifier, formed by rectifiers 84, 85 and capacitors 86, 87 connected to the load resistor 88. The load resistor 88 is connected to the trigger circuit of the oscilloscope to supply a voltage of the proper amplitude and polarity to start the horizontal sweep of the cathode ray beam.

What is claimed is:

1. The method of testing an electrical cable for non-linearities in the transmission characteristic of the cable which comprises momentarily supplying to the cable a first electromagnetic wave of one velocity of propagation, then, after the lapse of a predetermined time interval, momentarily supplying to the cable a second electromagnetic wave of a second, higher velocity of propagation, whereby said waves are caused to overlap within a determinable length of the cable and measuring the magnitude of the products of the intermodulation of said waves in said length of cable to indicate non-linearities in the transmission characteristic of the length of cable.

2. The method of testing an electrical cable for non-linearities in the transmission characteristic of the cable which comprises momentarily supplying to the cable a first electromagnetic wave of one velocity of propagation, then, after the lapse of a predetermined time interval, momentarily supplying to the cable a second electromagnetic wave of a second, higher velocity of propagation, whereby said waves are caused to overlap within a determinable length of the cable, measuring the magnitude of the products of the intermodulation of said waves in said length of cable to indicate non-linearities in the transmission characteristics and changing said time interval in successive tests to cause the waves to overlap within successive lengths of the cable.

3. Means for testing an electrical cable containing spaced amplifying devices including a first source of electromagnetic waves having one velocity of propagation, means for momentarily connecting said source to the cable to supply a first train of a few cycles of said waves, a second source of electromagnetic waves having a second, higher velocity of propagation, means for, after the lapse of a predetermined time interval, momentarily connecting said second source to the cable to supply a second train of several cycles of said waves, whereby said trains are caused to overlap in a length of the cable containing some of said devices and to intermodulate in any of these devices which have deteriorated, and means connected to said cable to indicate the products of intermodulation of said waves due to deterioration of said devices.

4. The combination of claim 3 with means for changing said time interval to cause successive trains of waves to overlap within successive lengths of the cable.

5. Means for testing an electrical cable containing spaced amplifying devices including a first source of electromagnetic waves having one velocity of propagation, means for momentarily connecting said source to the cable to supply a first train of a few cycles of said waves, a second source of electromagnetic waves having a second, higher velocity of propagation, means for, after the lapse of a predetermined time interval, momentarily connecting said second source to the cable to supply a second train of several cycles of said waves, whereby said trains of waves are caused to overlap in a length of the cable containing some of said devices and to intermodulate in any of these devices which have deteriorated, means for recurrently supplying trains of said waves to the cable and means connected to the cable to indicate the products of intermodulation of said waves.

6. The combination in claim 5 with means for changing said time interval between the recurrent applications of said waves.

JOHN J. GILBERT.

REFERENCES CITED

The following references are of record in the file of this patent:

UNITED STATES PATENTS

| Number | Name | Date |
| --- | --- | --- |
| 2,315,383 | Andrews | Mar. 30, 1943 |
| 2,315,450 | Nyquist | Mar. 30, 1943 |